US011241133B2

(12) United States Patent
Mai et al.

(10) Patent No.: US 11,241,133 B2
(45) Date of Patent: Feb. 8, 2022

(54) CHARGING STATION, CHARGING SYSTEM AND A METHOD FOR AUTOMATICALLY CHARGING A DEVICE

(71) Applicant: AmTRAN Technology Co., Ltd., New Taipei (TW)

(72) Inventors: Wei-Wen Mai, New Taipei (TW); Yi-Nan Lo, Taipei (TW); Li-Chun Yang, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 35 days.

(21) Appl. No.: 16/706,803

(22) Filed: Dec. 8, 2019

(65) Prior Publication Data

US 2020/0205630 A1    Jul. 2, 2020

(30) Foreign Application Priority Data

Dec. 26, 2018    (TW) ................................ 107147261

(51) Int. Cl.
*H02J 7/00*     (2006.01)
*A47L 9/28*     (2006.01)
*B60L 53/35*    (2019.01)
*B60L 53/16*    (2019.01)

(52) U.S. Cl.
CPC .......... *A47L 9/2873* (2013.01); *A47L 9/2884* (2013.01); *B60L 53/16* (2019.02); *B60L 53/35* (2019.02); *H02J 7/0044* (2013.01); *A47L 2201/022* (2013.01)

(58) Field of Classification Search
CPC ............................... A47L 9/2873; B60L 53/35

USPC ........................................................ 320/109
See application file for complete search history.

(56) References Cited

U.S. PATENT DOCUMENTS

| 4,679,152 A | * | 7/1987 | Perdue ................... B25J 19/005 |
| | | | 180/167 |
| 4,777,416 A | * | 10/1988 | George, II ........... G05D 1/0225 |
| | | | 318/568.12 |
| 10,243,379 B1 | * | 3/2019 | Kwa ....................... B60L 53/30 |
| 10,277,163 B1 | * | 4/2019 | Meller .................... H02S 40/10 |
| 2013/0193919 A1 | * | 8/2013 | Hill ......................... B60L 53/11 |
| | | | 320/109 |
| 2019/0092183 A1 | * | 3/2019 | Sussman ................ B60L 53/14 |
| 2019/0092184 A1 | * | 3/2019 | Sussman ............. G05D 1/0225 |
| 2019/0155295 A1 | * | 5/2019 | Moore ................. G05D 1/0236 |
| 2019/0155296 A1 | * | 5/2019 | Moore .................... B60L 53/36 |
| 2019/0231160 A1 | * | 8/2019 | Lu ....................... A47L 11/4005 |
| 2019/0280497 A1 | * | 9/2019 | Ebrahimi Afrouzi ....................... |
| | | | H01M 10/44 |
| 2020/0022553 A1 | * | 1/2020 | Gill ......................... A47L 9/102 |

(Continued)

FOREIGN PATENT DOCUMENTS

| CN | 204407986 U | 6/2015 |
| CN | 208081159 U | 11/2018 |

(Continued)

*Primary Examiner* — Suchin Parihar
(74) *Attorney, Agent, or Firm* — CKC & Partners Co., LLC (57) ABSTRACT

A charging station configured to be attached to a wall includes a main body, a rotatable arm, a restoring member, a charging port and a magnetic member. The main body is configured to be attached to the wall. The rotatable arm is rotatably connected to the main body. The restoring member is connected between the main body and the rotatable arm. The charging port and the magnetic member are disposed on a surface of the rotatable arm.

10 Claims, 5 Drawing Sheets

(56) References Cited

U.S. PATENT DOCUMENTS

| | | | | |
|---|---|---|---|---|
| 2020/0225673 A1* | 7/2020 | Ebrahimi Afrouzi | ........................ | |
| | | | G05D 1/0214 | |
| 2020/0275815 A1* | 9/2020 | Furuta | .................... | A47L 9/2805 |
| 2021/0086913 A1* | 3/2021 | Friedman | ................. | B60L 53/30 |
| 2021/0198093 A1* | 7/2021 | Graham | ............... | B25J 19/0029 |
| 2021/0347274 A1* | 11/2021 | Kadoko | ................ | H02J 7/0042 |

FOREIGN PATENT DOCUMENTS

| | | |
|---|---|---|
| CN | 208142852 U | 11/2018 |
| CN | 208158153 U | 11/2018 |
| TW | M412591 U1 | 9/2011 |

* cited by examiner

CHARGING STATION, CHARGING SYSTEM AND A METHOD FOR AUTOMATICALLY CHARGING A DEVICE

RELATED APPLICATIONS

This application claims priority to Taiwan Application Serial Number 107147261, filed Dec. 26, 2018, the disclosure of which is incorporated herein by reference in its entirety.

BACKGROUND

Technical Field

The present disclosure relates to a charging station, a charging system and a method for charging a device.

Description of Related Art

Robotic vacuum cleaner is currently a very popular indoor cleaning tool. A robotic vacuum cleaner typically has a pairing charging dock. The robotic vacuum cleaner would automatically return to the charging dock for recharging the battery when battery power is too low or the cleaning task is completed. Conventional charging docks for robotic vacuum cleaners are typically placed on the floor. However, this kind of design would create unclean blind spots around the charging dock, where dust would accumulate and cannot be easily removed manually or by the robotic vacuum cleaners.

In order to avoid the aforementioned situation, some designs of robotic vacuum cleaners adopt wireless charging technology, which targets to resolve the problems of the unclean blind spots around the charging docks. However, other problems are also introduced with such designs, such as inefficient recharging speed and high production cost, which make such robotic vacuum cleaners difficult to be commercialized.

Consequently, how to provide a charging station for robotic vacuum cleaner that can resolve the aforementioned issues is one of the directions that should be urgently endeavored in related product technologies.

SUMMARY

In view of the foregoing, one of the objects of the present disclosure is to provide a wall-mounted wired charging station that does not have to be placed on the floor.

To achieve the objective stated above, in accordance with an embodiment of the present disclosure, a charging station configured to be attached to a wall includes a main body, a rotatable arm, a restoring member, a station-side charging port and a station-side magnetic member. The main body is configured to be attached to the wall. The rotatable arm is rotatably connected to the main body. The restoring member is connected between the main body and the rotatable arm. The station-side charging port and the station-side magnetic member are disposed on a surface of the rotatable arm.

In one or more embodiments of the present disclosure, the charging station further includes a protective cover connected to the main body and covering the rotatable arm. The protective cover has an opening. The station-side charging port is exposed through the opening when the rotatable arm is rotated relative to the main body to a charging position.

In one or more embodiments of the present disclosure, the station-side magnetic member includes a permanent magnet or an electromagnet.

In one or more embodiments of the present disclosure, the main body has a recessed portion. The rotatable arm is rotatably connected to a side wall of the recessed portion.

In one or more embodiments of the present disclosure, the restoring member includes a tension spring.

In accordance with an embodiment of the present disclosure, a charging system includes a charging station and a battery-powered automatic device. The charging station has a station-side charging port and a station-side magnetic member that are disposed on a surface of a rotatable arm. The automatic device is configured to move on a floor and includes a chassis, a device-side charging port and a device-side magnetic member. The device-side charging port is disposed on the chassis and is configured to electrically couple with the station-side charging port. The device-side magnetic member is disposed on the chassis and is configured to attract and attach to the station-side magnetic member.

In one or more embodiments of the present disclosure, the chassis has a top surface. The device-side charging port and the device-side magnetic member are exposed on the top surface of the chassis.

In accordance with an embodiment of the present disclosure, a charging method configured to charge a battery-powered automatic device moving on a floor with a charging station attached to a wall. The charging station includes a main body, a rotatable arm rotatably connected to the main body, and a station-side charging port and a station-side magnetic member both disposed on the rotatable arm. The automatic device includes a device-side charging port and a device-side magnetic member. The charging method includes: moving the automatic device to an underside of the charging station; and magnetically attracting the station-side magnetic member with the device-side magnetic member, such that the rotatable arm is rotated towards the automatic device, and that the station-side charging port electrically couples with the device-side charging port.

In one or more embodiments of the present disclosure, the charging station further includes a restoring member connected between the main body and the rotatable arm. The charging method further includes: after battery charging process is completed, decoupling the station-side magnetic member and the device-side magnetic member, such that the rotatable arm is rotated away from the automatic device by the restoring member, and that the station-side charging port detaches from the device-side charging port.

In one or more embodiments of the present disclosure, the station-side magnetic member is a permanent magnet, and the device-side magnetic member is an electromagnet. Magnetically attracting the station-side magnetic member with the device-side magnetic member includes: providing electric power to the electromagnet to magnetically attract the permanent magnet.

In summary, the charging station of the present disclosure has a station-side charging port and a station-side magnetic member disposed on a rotatable arm. By this arrangement, with the presence of an attractive magnetic force, the station-side charging port of the charging station may be rotated to couple with a device-side charging port of a battery-powered automatic device to charge the automatic device. The charging station further includes a restoring member that is connected to the rotatable arm. After the charging process is completed, the restoring force provided by the restoring member may separate the station-side charging port of the charging station from the device-side charging port of the automatic device, such that the automatic device may leave the charging station freely, without damaging the charging ports.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

DETAILED DESCRIPTION

For the sake of the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Figure 1:
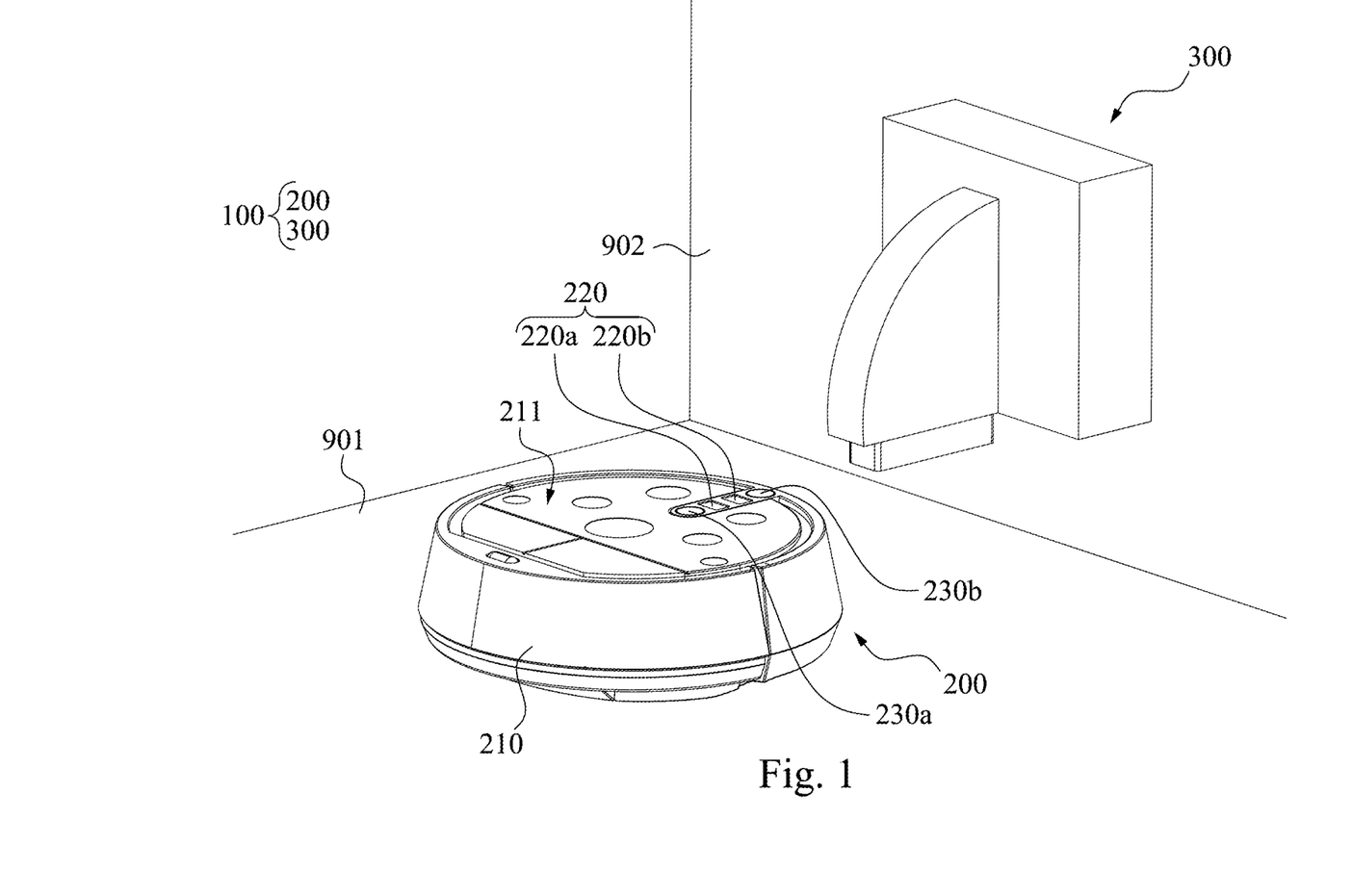
FIG. 1 illustrates a perspective view of a charging system in accordance with an embodiment of the present disclosure.

Reference is made to FIG. 1, which illustrates a perspective view of a charging system 100 in accordance with an embodiment of the present disclosure. The charging system 100 includes a battery-powered automatic device 200 and a wall-mounted charging station 300. The automatic device 200 is configured to move on a floor 901. The charging station 300 is configured to be attached to a wall 902. In the present embodiment, the automatic device 200 is a robotic vacuum cleaner. The robotic vacuum cleaner is equipped with a battery as power source, which is not depicted in the figures, and is capable of freely moving on the floor 901 to carry out the cleaning task without having any power cord connected thereto, including cleaning the part of the floor 901 beneath the charging station 300. The wall-mounted charging station 300 is configured to recharge the automatic device 200. For example, when the automatic device 200 completed its cleaning task or when the power level of the battery within automatic device 200 is below a threshold value, the automatic device 200 may move to the underside of the charging station 300 for battery charging. The structure of the automatic device 200 and the charging station 300 will be discussed in detail below.

As shown in FIG. 1, the automatic device 200 includes a chassis 210, a device-side charging port 220 and two device-side magnetic members 230a and 230b. The device-side charging port 220 and the device-side magnetic members 230a and 230b are disposed on the chassis 210 and are exposed on a top surface 211 of the chassis 210. The device-side charging port 220 includes a first electrode 220a and a second electrode 220b. The first electrode 220a, the second electrode 220b and the device-side magnetic members 230a and 230b are arranged straightly along a direction.

The device-side magnetic members 230a and 230b are positioned beside the first electrode 220a and the second electrode 220b. However, the present disclosure is not limited to the aforementioned arrangement. The first electrode 220a, the second electrode 220b and the device-side magnetic members 230a and 230b may be arranged in other ways. The arrangement, shapes, the sizes and the quantities of the electrodes or the magnetic members can be designed differently in order to meet the practical needs or requirements in applications. The battery of the automatic device 200 is disposed inside the chassis 210, which is not depicted in the figures, and the battery is electrically coupled to the device-side charging port 220. Accordingly, the charging station 300 can charge the battery through the electrical connection with the exposed device-side charging port 220.

Figure 2:
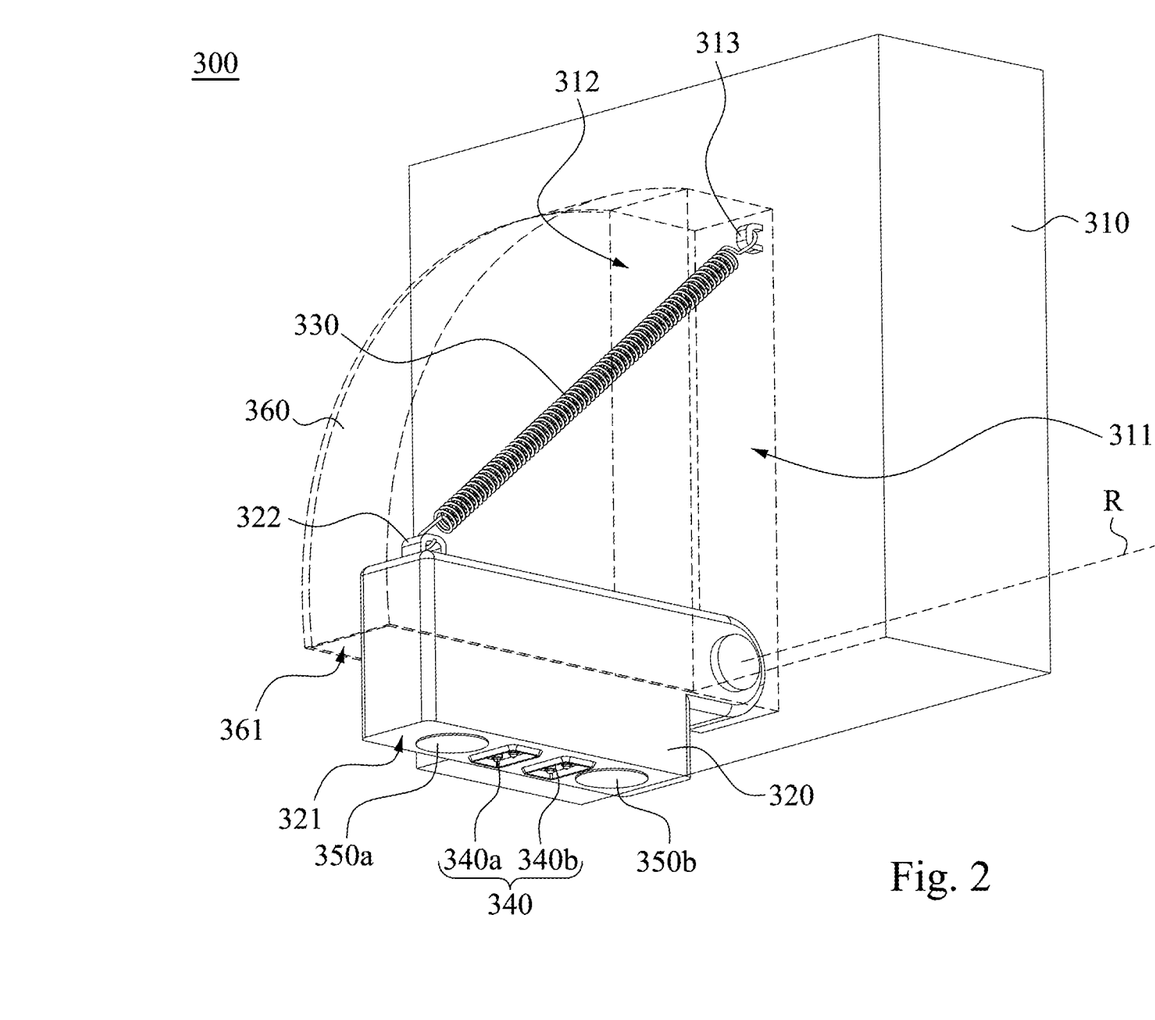
FIG. 2 illustrates a perspective view of the charging station of the charging system shown in FIG. 1.

Reference is made to FIG. 2, which illustrates a perspective view of the charging station 300 of the charging system 100 shown in FIG. 1. It is to be noted that the protective cover 360 of the charging station 300 is illustrated in broken lines in FIG. 2 in order to provide a clear view of the internal structures of the charging station 300. The charging station 300 includes a main body 310, a rotatable arm 320, a restoring member 330, a station-side charging port 340 and two station-side magnetic members 350a and 350b. The main body 310 is configured to be attached to the wall 902, so the charging station 300 can be fixed on the wall 902 as illustrated in FIG. 1. For example, the main body 310 may be attached to the wall 902 with tapes, glues, screws, hooks or other suitable means. In some embodiments, the main body 310 contains a control circuit electrically coupled to an electrical power socket on the wall 902 through a power cord and plug. The control circuit, the electrical power socket, the power cord, and the power plug are not specifically depicted in the figures. The control circuit is configured to convert the power provided by the electrical power socket to the operating voltage and current of the automatic device 200, which is output through the station-side charging port 340. In some embodiments, the main body 310 includes a power plug disposed on a surface of the main body 310 that can be directly plugged into the electrical power socket on the wall 902, which may eliminates the need for the power cord. In such embodiments, the electrical power socket is required to be positioned at a suitable height on the wall 902.

As shown in FIG. 2, the rotatable arm 320 is rotatably connected to the main body 310. Specifically, the main body 310 has a recessed portion 311 which is also illustrated in broken lines in FIG. 2, and the rotatable arm 320 is rotatably connected to a side wall 312 of the recessed portion 311. When the charging station 300 is attached to the wall 902, the rotatable arm 320 is configured to rotate about an axis R. Specifically, when the automatic device 200 moves to the position under the charging station 300, the rotatable arm 320 can rotate downwards about the axis R and contact the automatic device 200, or rotate upwards about the axis R and separate from the automatic device 200. In some embodiments, the axis R is parallel to the floor 901, but the present disclosure is not limited thereto.

As shown in FIG. 2, the rotatable arm 320 has a bottom surface 321. The station-side charging port 340 and the station-side magnetic members 350a and 350b are disposed on the bottom surface 321 of the rotatable arm 320. The station-side charging port 340 includes a first electrode 340a and a second electrode 340b which are configured to electrically couple with the first electrode 220a and the second electrode 220b of the device-side charging port 220 respectively. During the battery charging process, the station-side magnetic members 350a and 350b are configured to be attracted by and attach to the device-side magnetic members 230a and 230b on the automatic device 200.

The station-side charging port 340 and the station-side magnetic members 350a and 350b are arranged in the same way as how the device-side charging port 220 and the device-side magnetic members 230a and 230b are arranged. In an embodiment of the present invention, the first electrode 340a, the second electrode 340b and the station-side magnetic members 350a and 350b are arranged straightly along a direction, and the station-side magnetic members 350a and 350b are positioned beside the first electrode 340a and the second electrode 340b.

As shown in FIG. 2, the restoring member 330 is a tension spring connected between the main body 310 and the rotatable arm 320. The main body 310 has a first buckle 313 disposed on a bottom surface of the recessed portion 311. The rotatable arm 320 has a second buckle 322. The second buckle 322 is disposed on a top surface of the rotatable arm 320 and is located at an end of the rotatable arm 320 away from the main body 310. The two ends of the restoring member 330 are hooked at the first buckle 313 and the second buckle 322 respectively. The restoring member 330 is configured to provide the rotatable arm 320 with a torque to rotate upwards after the battery charging of the automatic device 200 is finished, so as to separate the rotatable arm 320 from the automatic device 200 and to allow the automatic device 200 to leave the charging station 300 freely. It is to be understood that the restoring member 330 may be a torsion spring, an elastic band or other devices alternatively that can also provide the required restoring force. The present disclosure is however not limited thereto.

In some embodiments, as shown in FIG. 2, the charging station 300 further includes a protective cover 360, which is shown in broken lines in FIG. 2. The protective cover 360 is connected to the main body 310 and covers the rotatable arm 320. The protective cover 360 serves to protect the rotatable arm 320, with the station-side charging port 340 and the station-side magnetic members 350a and 350b located on the bottom surface 321 of the rotatable arm 320, in order to avoid damages from impact. The protective cover 360 has an opening 361 at its bottom. When the rotatable arm 320 is rotated relative to the main body 310 to a battery charging position, such as the position of the rotatable arm 320 shown in FIGS. 2 and 5, the station-side charging port 340 and the station-side magnetic members 350a and 350b are exposed through the opening 361. On the other hand, after the battery charging of the automatic device 200 is finished, the rotatable arm 320 will return to a standby position as shown in FIG. 4, where the rotatable arm 320 is mostly hidden in the protective cover 360 and is thus protected by the protective cover 360.

It is to be understood that although the automatic device 200 and the charging station 300 are illustrated as having two magnetic members respectively, such as the device-side magnetic members 230a and 230b of the automatic device 200 and the station-side magnetic members 350a and 350b of the charging station 300 shown in FIGS. 1 and 2, the present disclosure is not limited thereto. The skilled person may adjust the quantity or arrangement of the magnetic members in order to meet the requirements of different applications and practical needs. As long as the magnetic members on the automatic device 200 and the charging station 300 can be firmly attached such that the electrical connection between the station-side charging port 340 and the device-side charging port 220 can be stably maintained. In some embodiments, the automatic device 200 may include a single circular-shaped or arc-shaped magnetic member surrounding or partially surrounding the device-side charging port 220, and the charging station 300 may include a corresponding single circular-shaped or arc-shaped magnetic member surrounding or partially surrounding the station-side charging port 340.

Figure 3:
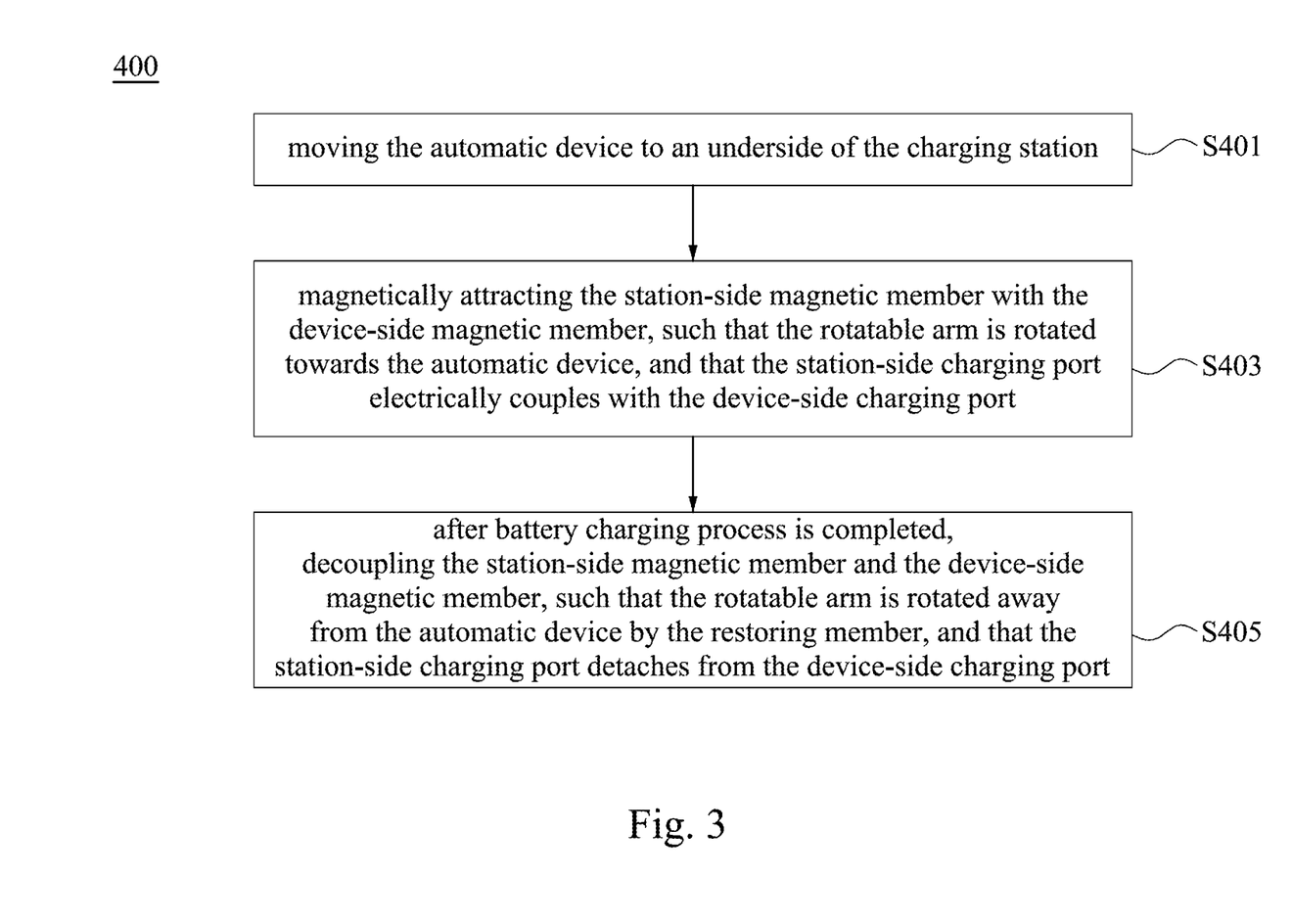
FIG. 3 illustrates a flowchart of a charging method in accordance with an embodiment of the present disclosure.

Reference is made to FIG. 3, which illustrates a flowchart of a charging method 400 in accordance with an embodiment of the present disclosure. The charging method 400 provides the process for charging the battery of the automatic device 200 with the charging station 300. The charging method 400 includes step S410 to step S405.

Figure 4:
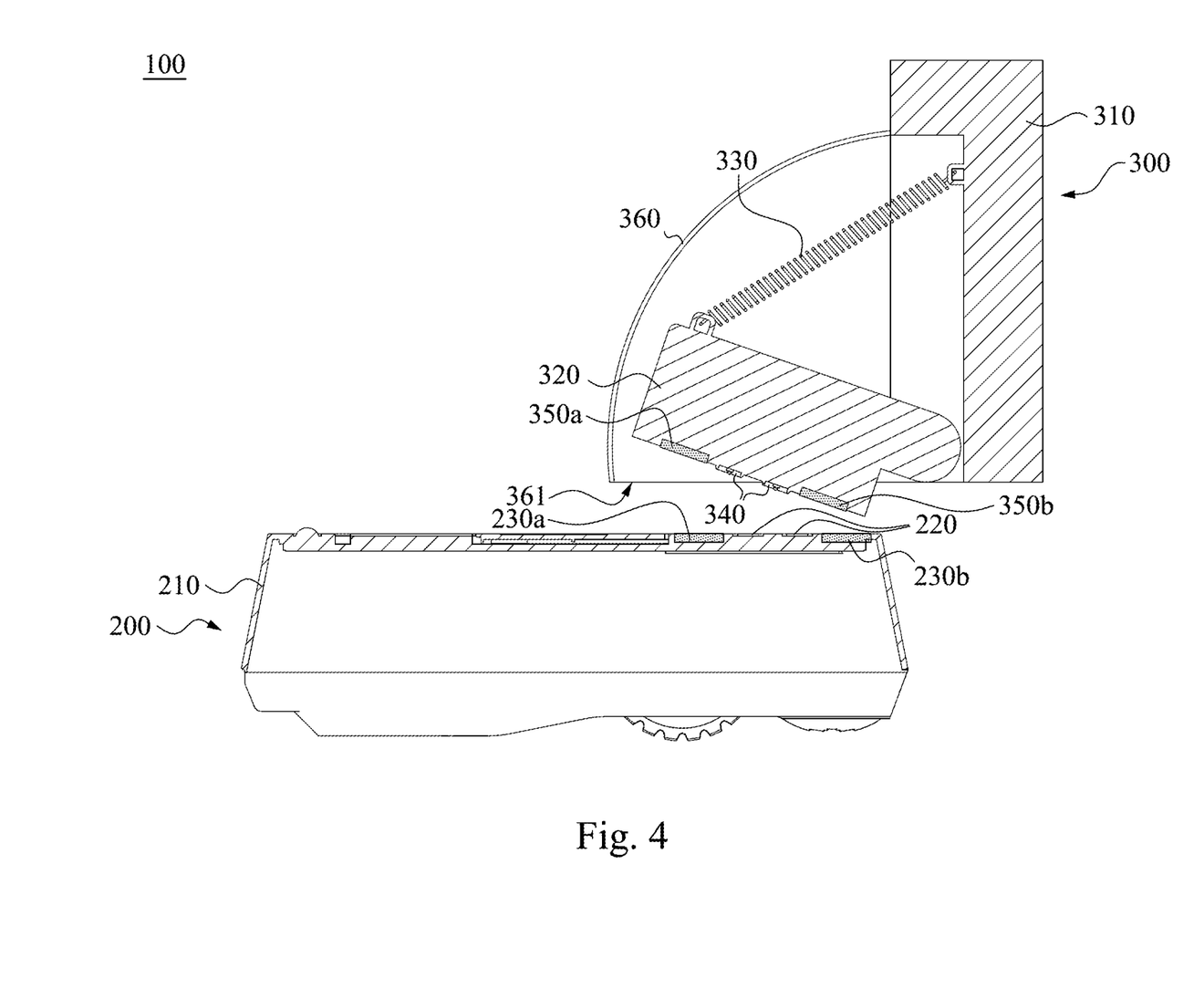
FIGS. 4 and 5 illustrate schematic views at different stages of the charging method shown in FIG. 3.

Reference is made to FIG. 4 along with FIG. 3. In step S401, the automatic device 200 moves to the position under the charging station 300. Specifically, in some embodiments, the automatic device 200 is a robotic vacuum cleaner. When the cleaning task is completed or when the power level of the battery is lower than a threshold value, the robotic vacuum cleaner moves to the underside of the charging station 300 and gets ready for battery charging, such as entering a standby mode or a battery charging mode. In some embodiments, the charging station 300 includes a positioning signal transmitter. The automatic device 200 has an automatic navigation function that tracks the positioning signal provided by the positioning signal transmitter within the charging station 300, and can thus automatically move to the underside of the charging station 300. In some embodiments, the automatic device 200 may be equipped with a camera, a light detection and ranging (LiDAR) system or other suitable sensors, which assist the automatic device 200 in determining the position of the charging station 300 relative to the automatic device 200 more precisely, such that the automatic device 200 can move to the designated position below the charging station 300 where the station-side charging port 340 can directly contact and establish electrical connection with the device-side charging port 220.

Figure 5:
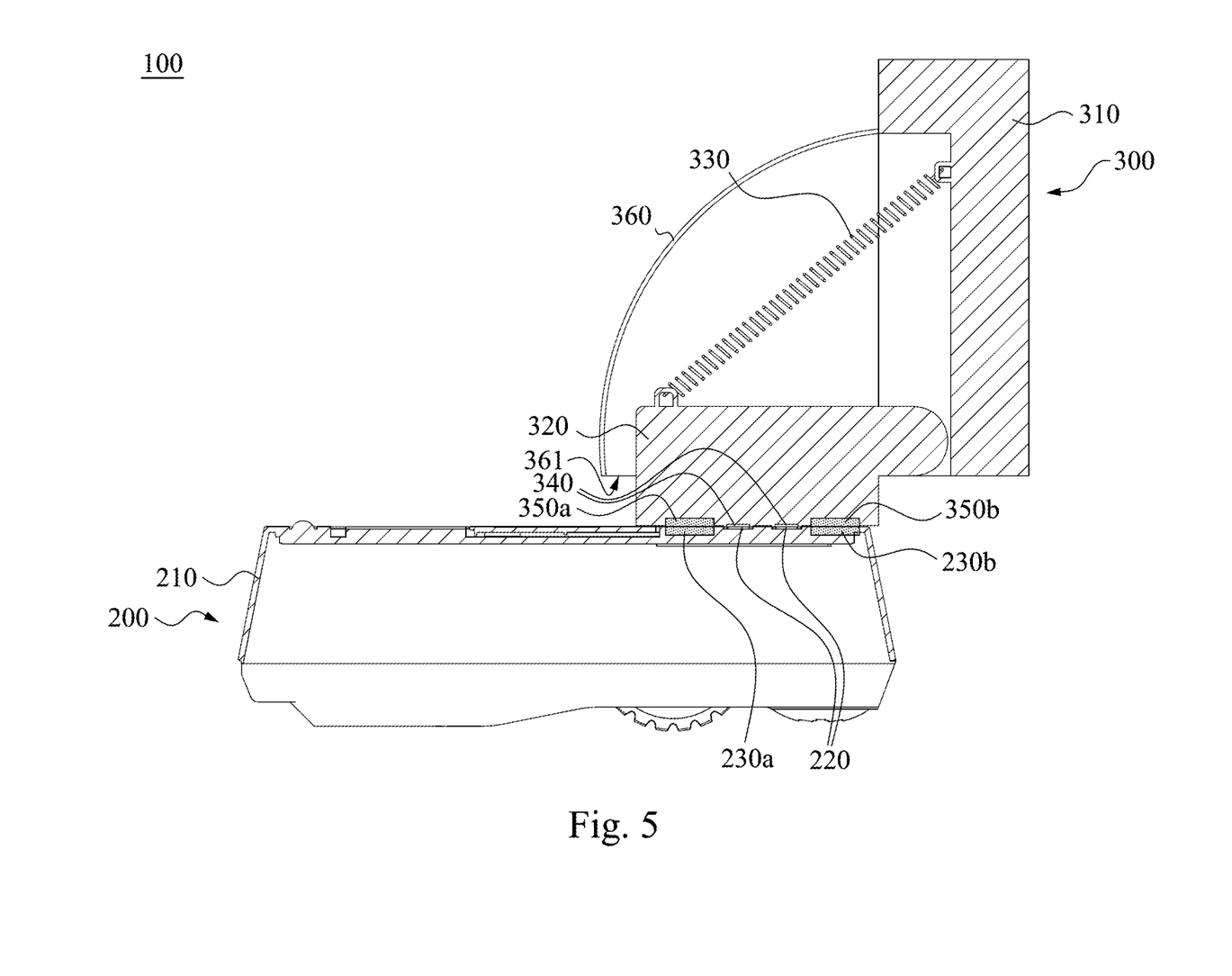

Reference is made to FIG. 5 along with FIG. 3. In step S403, the station-side magnetic members 350a and 350b of the charging station 300 and the device-side magnetic members 230a and 230b of the automatic device 200 are magnetically attracted to each other, such that the rotatable arm 320 of the charging station 300 is rotated towards the automatic device 200 and the station-side charging port 340 electrically couples with the device-side charging port 220.

Specifically, in the some embodiments, the station-side magnetic members 350a and 350b of the charging station 300 are permanent magnets, and the device-side magnetic members 230a and 230b of the automatic device 200 are electromagnets. When the device-side magnetic members 230a and 230b are not supplied with power, the rotatable arm 320 is at a standby position as shown in FIG. 4 and not attracted to the automatic device 200. The rotatable arm 320 at the standby position inclines slightly upwards as supported by the restoring member 330, and the rotatable arm 320 is mostly hidden in the protective cover 360. When the device-side magnetic members 230a and 230b are supplied with power, the upper magnetic poles of the device-side magnetic members 230a and 230b are opposite to the lower magnetic poles of the station-side magnetic members 350a and 350b respectively and the station-side magnetic members 350a and 350b are attracted by the device-side magnetic members 230a and 230b, so the rotatable arm 320 is rotated downwards to a charging position as shown in FIG. 5. When the rotatable arm 320 is at the charging position, the station-side magnetic members 350a and 350b and the station-side charging port 340 disposed on the bottom surface 321 of the rotatable arm 320 are exposed through the opening 361 at the bottom of the protective cover 360.

Additionally, the station-side magnetic members 350a and 350b are attracted by the device-side magnetic members 230a and 230b respectively and attached thereto, which also makes the station-side charging port 340 electrically couples with the device-side charging port 220. After the station-side charging port 340 and the device-side charging port 220 are coupled, the charging station 300 can start charging the battery within the automatic device 200.

Reference is made to FIG. 4 along with FIG. 3 again. In step S405, after battery charging process is completed, the station-side magnetic members 350a and 350b of the charging station 300 and the device-side magnetic members 230a and 230b of the automatic device 200 are decoupled, which makes that the rotatable arm 320 of the charging station 300 is rotated away from the automatic device 200 by the restoring member 330 and the station-side charging port 340 of the charging station 300 detaches from the device-side charging port 220 of the automatic device 200.

Specifically, after the battery charging process is completed, the power supply to the device-side magnetic members 230a and 230b is stopped such that the magnetic poles of the device-side magnetic members 230a and 230b no longer exist. At this stage, the station-side magnetic members 350a and 350b are no longer magnetically attracted by the device-side magnetic members 230a and 230b. Consequently, the rotatable arm 320 is rotated upwards from the charging position as shown in FIG. 5 to the standby position as shown in FIG. 4. After the station-side charging port 340 is separated from the device-side charging port 220, the automatic device 200 is free to leave the charging station 300 and can enter into an operation mode to perform cleaning task.

When the automatic device 200 is performing cleaning task in the area beneath the charging station 300, the automatic device 200 can clean the area under the charging station 300 and moves freely. At this stage, the device-side magnetic members 230a and 230b are not supplied with power and the magnetic poles of the device-side magnetic members 230a and 230b do not exist. Therefore, the station-side magnetic members 350a and 350b would not be attracted by the device-side magnetic members 230a and 230b when the automatic device 200 is performing cleaning task, which prevents the automatic device 200 from being impacted by the rotatable arm 320 due to inadvertent or undesired rotation of the rotatable arm 320.

It is to be understood that the configurations of the station-side magnetic members 350a and 350b and the device-side magnetic members 230a and 230b are not limited to the embodiments described above. In some embodiments, the station-side magnetic members 350a and 350b comprise ferromagnetic material. In some embodiments, the station-side magnetic members 350a and 350b may also be electromagnetic material. The station-side magnetic members 350a and 350b may be constantly supplied with power to maintain the magnetism, or the power is supplied to the station-side magnetic members 350a and 350b only when the charging station 300 detects that the automatic device 200 is at the predetermined position for battery charging. Alternatively, the charging system 100 may include a wireless communication component configured to establish wireless communication with the automatic device 200. When the automatic device 200 moves to the predetermined position beneath the charging station 300 and enters into the battery charging mode, the automatic device 200 may send a notification signal to the charging station 300 through the wireless communication. The charging station 300 then supplies power to the station-side magnetic members 350a and 350b upon the receipt of the notification signal, such that the station-side magnetic members 350a and 350b have the magnetisms attracted by the device-side magnetic members 230a and 230b.

In summary, the charging station of the present disclosure has a station-side charging port and a station-side magnetic member disposed on a rotatable arm. With this arrangement, the rotatable arm of the charging station can be rotated by the magnetic force, such that the station-side charging port couples with a device-side charging port of an automatic device and performs the battery charging task. The charging station further includes a restoring member that is connected to the rotatable arm. After the battery charging process is completed, the restoring force provided by the restoring member will separate the station-side charging port of the charging station from the device-side charging port of the automatic device, such that the automatic device can leave the charging station freely. The damage to the charging ports is prevented.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A charging station configured to be electrically connected to an electrical power socket on a wall, and configured to charge an automatic device, the charging station comprising:
   a main body configured to be electrically connected to the electrical power socket on the wall;
   a rotatable arm rotatably connected to the main body;
   a restoring member connected between the main body and the rotatable arm;
   a station-side charging port disposed on a bottom surface of the rotatable arm; and
   a station-side magnetic member disposed on the bottom surface of the rotatable arm, wherein an entirety of the charging station is disposed on the wall and located higher than the automatic device to allow the automatic device to move freely in an area beneath the charging station.

2. The charging station of claim 1, further comprising:
   a protective cover connected to the main body and covering the rotatable arm, the protective cover having an opening, wherein the station-side charging port is exposed through the opening when the rotatable arm is rotated relative to the main body to a charging position.

3. The charging station of claim 1, wherein the station-side magnetic member comprises a permanent magnet or an electromagnet.

4. The charging station of claim 1, wherein the main body has a recessed portion, and the rotatable arm is rotatably connected to a side wall of the recessed portion.

5. The charging station of claim 1, wherein the restoring member comprises a tension spring.

6. A charging system, comprising:
   a charging station configured to be electrically connected to an electrical power socket on a wall, the charging station having a station-side charging port and a station-side magnetic member that are disposed on a bottom surface of a rotatable arm; and
   a battery-powered automatic device configured to move on a floor, and comprising:

a chassis;

a device-side charging port disposed on the chassis and configured to electrically couple with the station-side charging port; and a device-side magnetic member disposed on the chassis and configured to attract and attach to the station-side magnetic member, wherein an entirety of the charging station is disposed on the wall and located higher than the battery-powered automatic device.

7. The charging system of claim 6, wherein the chassis has a top surface, the device-side charging port and the device-side magnetic member are exposed on the top surface.

8. A charging method configured to charge a battery-powered automatic device moving on a floor with a charging station electrically connected to an electrical power socket on a wall, the charging station comprising a main body, a rotatable arm rotatably connected to the main body, and a station-side charging port and a station-side magnetic member both disposed on a bottom surface of the rotatable arm, the automatic device comprising a device-side charging port and a device-side magnetic member, the charging method comprising:

disposing the charging station on the wall, wherein an entirety of the charging station is disposed on the wall and located higher than the automatic device;

moving the automatic device to an underside and below the charging station; and magnetically attracting the station-side magnetic member with the device-side magnetic member, such that the rotatable arm is rotated towards the automatic device, and that the station-side charging port electrically couples with the device-side charging port.

9. The charging method of claim 8, wherein the charging station further comprises a restoring member connected between the main body and the rotatable arm, and the charging method further comprises:

after battery charging process is completed, decoupling the station-side magnetic member and the device-side magnetic member, such that the rotatable arm is rotated away from the automatic device by the restoring member, and that the station-side charging port detaches from the device-side charging port.

10. The charging method of claim 8, wherein the station-side magnetic member is a permanent magnet, the device-side magnetic member is an electromagnet, and magnetically attracting the station-side magnetic member with the device-side magnetic member comprises:

providing electric power to the electromagnet to magnetically attract the permanent magnet.

\* \* \* \* \*